Oct. 27, 1953

P. KUHAR 2,657,351

ELECTRIC REGULATOR DEVICE AND SYSTEM
FOR CHARGING STORAGE BATTERIES

Filed April 28, 1948

INVENTOR.
Petter Kuhar
BY
Ebes J. Hyde
ATTORNEY

INVENTOR.
Petter Kuhar
BY
Ebers J. Hyde
ATTORNEY

UNITED STATES PATENT OFFICE 2,657,351

ELECTRIC REGULATOR DEVICE AND SYSTEM FOR CHARGING STORAGE BATTERIES

Petter Kuhar, Cleveland, Ohio

Application April 28, 1948, Serial No. 23,793

13 Claims. (Cl. 320—28)

This invention pertains to means for regulating an electrical system, and more particularly to the means for controlling voltage and current in an electrical system which includes a storage battery, as in an automobile.

The electrical system of an automobile must be controlled by a very flexible and reliable regulator because of the widely varying climatic conditions under which the regulator must operate and because of the number of variable conditions which exist in the electrical circuit. Variable conditions such as the battery charge, the electrical load on the system, the rate at which the car is operating which alters the generator output, and the acceleration of the car which varies the operation of the mechanical portions of the regulator all influence the operation of a regulator.

It is desirable to quickly recharge the battery after starting the car, yet too much current into the battery is harmful. After a car has been started it is desirable that the generator carry the entire electrical load, and as lights are switched on and the radio started the generator should produce more current so that the battery is not discharged. The regulator must prevent the electrical system from being burned out due to too high voltage. This danger is often encountered when a car has been traveling at high speeds for a long period of time. The battery becomes fully charged and the generator runs at high speed because it is generally connected to the engine in such a manner that as the car speed increases the generator speed increases. The electrical system is then subject to damage due to momentary failure of the voltage cut-out. Winter-driving usually taxes a battery much more than summer-driving because starting a cold car takes much more out of a battery than starting a warmer car, and also because most persons do not drive as far in the winter as they do in the summer, thereby reducing the battery charging time.

It is an object of this invention to provide a regulator device for the electrical system of an automobile which will meet all of the aforementioned requirements, and which is inexpensively manufactured in one simple, small, convenient unit.

A further object of the invention is to provide a regulator device for the electrical system of an automobile which is constructed almost entirely of metal stampings thereby reducing the cost, and which is very easily adjusted when manufactured.

A further object of the invention is to provide a regulator device for the electrical system of an automobile which can easily be installed as a replacement for a defective regulator.

It is an object of the invention to provide a regulator device for the electrical system of an automobile which automatically adjusts itself for hot and cold weather driving to give a higher charging rate in cold weather and a lower charging rate in hot weather.

Another object of the invention is to provide a regulator device for the electrical system of an automobile which includes a generator whose field excitation does not entirely collapse when the vibrating-switch armature contacts are held open by dirt, so that the remaining generator field and variation of pull on the contact armature produce a wiping action to produce a new clean contact almost instantly, thus making a self-cleaning contact switch.

Still another object of the invention is to provide a regulator device for the electrical system of an automobile whose action is substantially entirely independent of variable acceleration forces.

Another object of the invention is to provide a regulator device for the electrical system of an automobile whose contact points are not subject to destructive electrical arcing and which will not pit.

It is also an object of the invention to provide a regulator device for the electrical system of an automobile which will not burn out when one of the battery cells is substantially short-circuited.

Yet another object of the invention is to provide a regulator device for the ignition system of a vehicle which will not be destroyed or harmed if one of the cells of the vehicle's battery goes dead.

It is above all an object of the invention to provide a reliable regulator device for an automobile electrical system which can be easily installed and which is inexpensive due to its simple construction yet which is sufficiently flexible to operate well under all of the variable operational conditions.

For a better understanding of the present invention, together with other and further objects thereof, reference is had to the following description taken in connection with the accompanying drawings, and its scope will be pointed out in the appended claims.

In the drawings Figure 1 is an isometric view of the regulator device of the invention.

In one concept, the invention relates to an electrical system in combination with a generator having a field winding, a storage battery and regulator means comprising armature means supported for pivotal motion at its center of balance and circuit means including electromagnet means responsive to electrical changes in the circuit means for pivoting the armature about its support.

In another concept the invention is the combination, in an electrical system, with a generator having a field winding and a storage battery, of regulator means comprising generator field circuit means connected from the generator armature to the field winding. The generator field circuit means includes a field switch and a first armature carrying one of the contact points of the field switch. The field switch is closed when the generator is not generating current. Electromagnetic field coil means are connected to ground in parallel with the field winding and in parallel with the field switch, and battery circuit means connect the generator to the battery and include a battery switch and a second electrically conductive armature carrying one of the contact points of the battery switch. Battery coil means are connected in series between the generator and the battery and the battery switch is open when the generator is not generating current. The electromagnetic field coil means establish an electromotive force for closing the battery switch and for tending to open the field switch when the generator generates sufficient current to charge the battery.

Figure 1:
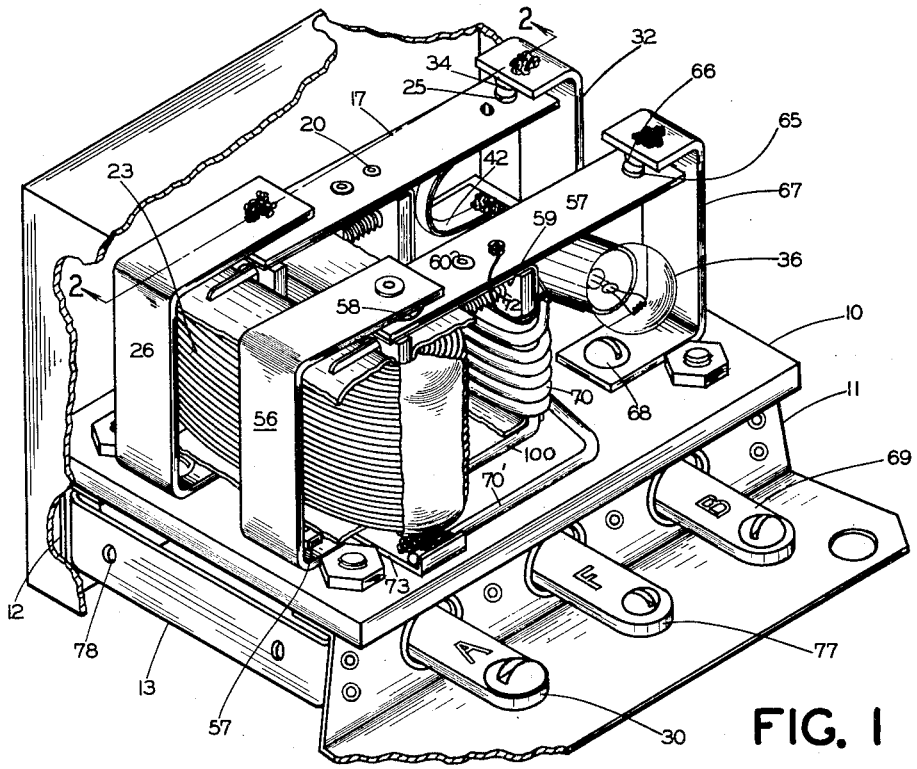
Figure 2:
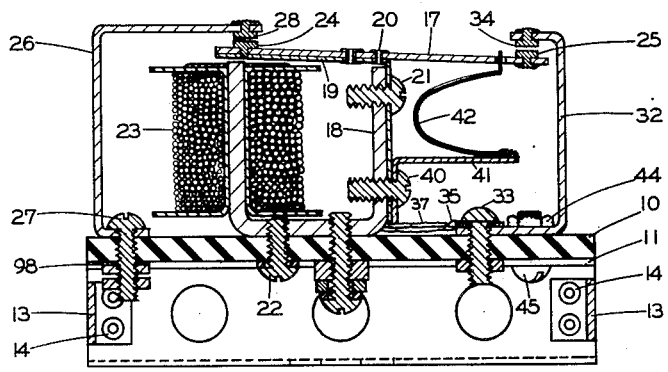
Figure 2 is a sectional view taken along line 2—2 of Figure 1.
Figure 3:
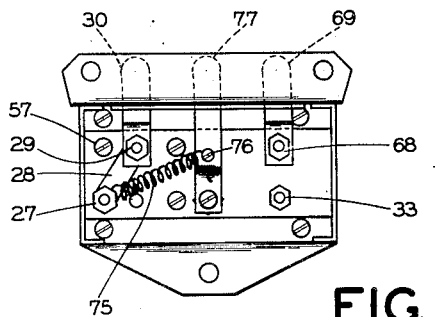
Figure 3 is a bottom view of the device on a reduced scale.

With reference to the Figures 1, 2 and 3, the device of the invention comprises a base 10 formed of an insulating material. Mounted by means of nuts and bolts, or the like, to the base 10 is a metal bracket which has a front portion 11, back portion 12, and side bars 13. The side bars are connected to the front portion and to the back portion 12 by means of rivets or the like 14 and serves to make the unit rigid.

A first vibratory armature 17 is connected to a bracket 18 by means of a strip of spring metal 19. The armature 17 is riveted by rivets 20 to the spring metal 19, and the spring metal in turn is connected to the bracket 18 by means of screws 21. The bracket 18 is made of a heavy portion of soft iron and it is secured to the base 10 by means of the screw 22.

The bracket 18 is substantially U-shaped, the armature 17 being secured to one of its legs, and coil means 23 being wrapped around its other leg.

The vibratory armature 17 is mounted so that the bracket 18 is positioned substantially at its longitudinal center, and the spring 19 serves to bias the left end of the armature 17 in an upward direction, as seen in Figure 2. The left end of the armature 17 has connected to it a contact point 24, and the right-hand end carries a contact point 25. An electrically conductive metal arm 26 is secured to the base 10 by means of a screw 27, and it carries at its outer end a contact point 28 positioned immediately above the contact point 24. The bias of the spring 19 serves to normally keep contacts 24 and 28 together. The metal arm 26 is electrically connected by means of the screw 27 extending through the base 10 to a copper strap 98 which is mounted on the bottom face of the base 10, as seen in Figures 2 and 3.

The other end of the copper strap 98 is connected by means of the screw 29 to the terminal marked "A" which extends through a hole in the front side of the frame 11. A second metal arm 32 is connected to the base 10 by means of a screw 33. This second metal arm extends away from the base 10 and carries a contact point 34 in its outer end in such position that it is immediately above the contact point 25 mounted on the armature 17. One end of a copper strap 35 is secured between the head of the screw 33 and the metal arm 32, and the other end of the copper strap is soldered onto a light bulb 36 thereby holding the light bulb and serving as one of the electrical connections thereto. A wire 37 is also connected between the head of the screw 33 and the metal arm 32. This wire 37 extends to the coil means 23, as is more clearly shown in the circuit diagram of Figure 4. A screw 40 extends through the bracket 18 and secures an outwardly extending metal base 41 rigidly thereto. The metal base 41 is positioned substantially directly beneath the right-hand end of the armature 17 and a temperature sensitive metal member 42 is positioned between the metal base 41 and the right-hand end of the armature 17. A ground connection comprising a nut 44 which is threaded onto the screw 45 is provided, and a number of wires shown in better detail in the circuit diagram are connected to the nut 44. The head of the screw 45 is in good electrical contact with a portion of the frame 11.

A second vibratory armature 57 is provided, as shown in Figure 1. It is mounted on a second soft metal bracket 100 which is secured to the base 10 in a manner similar to that by which the bracket 18 is secured to the base 10. A spring member 59 is connected to the bracket 100 and is connected to the armature 57 by means of rivets 60. A metal arm 56 is connected to the base 10 by means of a screw 57 and the upper end of the arm 56 carries a contact 58 on its underneath surface. This contact 58 serves to limit the upper motion of the left-hand end of armature 57. The right-hand end of the armature 57 carries a contact point 65 and spaced immediately above it is a contact point 66 which is mounted on a metal arm 67 which in turn is secured to the base 10 by means of the screw 68. The screw 68 extends to the base 10, and the terminal 69 marked "B" is secured to the base 10 by means of the screw 68 and is in electrical contact with it. A coil 70 comprising a few turns of heavy wire is wrapped around one of the upstanding legs of the U-shaped bracket 100. The upper end of the wire comprising coil 70 is secured and electrically connected to the bracket 100 by means of the screw 72. The other end 70' of the coil 70 extends over to a metal strip 73 where it is soldered, and the metal strip 73 extends in underneath the coil means 23 where it is in electrical contact with the upper end of the screw 29 (Fig. 3). The screw 29 is in electrical contact with the A terminal.

Referring to Figure 3, a resistor coil 75 has one of its ends connected to the screw 27 and its other end connected to the small screw 76 through the terminal bar 77 which is marked on its top face with the letter "F."

A sheet metal container, not shown, may be positioned over the entire top portion of the device and secured thereto by screws which extend into the holes 78 in the side bars 13 thereby enclosing the entire structure except the resistor 75 and the nuts which are shown in the bottom view of Figure 3. The outer ends of the terminals A and B likewise are not enclosed as they extend out through holes in the side 11 of the metal frame. By enclosing the armatures 17 and 57, the coil means 23 and 70, the temperature sensitive element 42, and the light bulb 36 in an enclosure, they are protected from dust and dirt.

Figure 4:
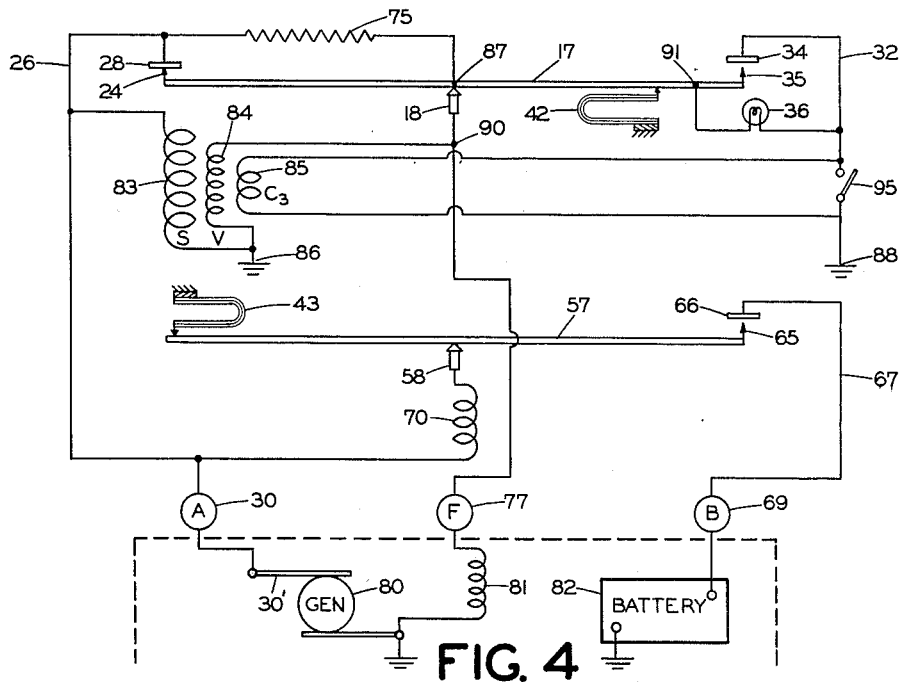
Figure 4 is a circuit diagram of the regulator device connected into the electrical system of one popular make of automobile.

Figure 4 is a circuit diagram of the device shown in Figures 1, 2 and 3.

The terminal 30 which is marked "A" in Figure 1 is connected to an armature of a generator 80. The terminal 77, marked "F" in Figure 1, is connected to the field winding 81 of the generator 80 and then to ground. The terminal 69, marked "B" in Figure 1, is connected to the hot side of battery 82. The generator 80 and the battery 82 comprise part of an electrical system such as may be found in an automobile.

The generator 80 through its brush 30' and the terminal 30 is connected to field circuit means and to the contact 28 mounted on the metal arm 26. In the circuit diagram of Figure 4 and Figure 5 to follow, the metal portions of the device which serve as conductors are shown and described as wires. The contact points 24 and 28 normally are maintained closed by the spring 19, and the resistor 75 is electrically connected around the contact points 28, 24. The coil means 23 in one form of the invention is comprised of three coils 83, 84, and 85. Each of these three coils is wound around one leg of each of the brackets 18 and 100, as is shown in Figure 1, and each serves to produce an electromagnetic field which tends to pull the contact point 24 away from contact point 28 and also to pull the left-hand end of the armature 57 down toward the coil means, thus tending to close contact point 65 against contact point 66. One end of the coil 83 is connected in the field circuit means between the generator 80 and the field switch 24, 28. The other end of the coil 83 is connected to ground at 86. One end of the coil 84 is electrically connected to the armature 17 at point 87 and is connected electrically in series with the resistor 75 to the generator 80, and its other end is connected to ground at 86. The coil 85 is in series with the light bulb 36 and is electrically connected to the armature 17. The other end of the coil 85 is connected to ground at 88. The contact points 35 and 34 are closed when the right-hand end of the armature 17 is in its upward position thereby shunting out the light bulb 36.

One end of the field winding 81 is connected to ground and the other end is connected through the terminal F to the bracket 18.

The hot side of the battery 82 is connected through the terminal B to the contact point 66. When the automobile is not being operated contact points 65 and 66 are spaced from each other.

In the operation of this system and device, the contact points 65, 66 are normally spaced from each other to prevent the generator 80 from running as a motor, thereby discharging the battery 82. These contact points are held open by means of the spring 59 biasing the armature 57 about the bracket 100.

When a person starts his car, the generator 80 is simultaneously put into operation, as is well known in the art.

Before the car is running fast enough to build up a high generator voltage, current from the generator 80 passes through the normally closed contact points 28, 24 to the generator field 81 and then to ground. This builds up the field so that the generator is operated as a shunt generator. Some of the current from the generator, however, goes through the coil 83 to ground. This establishes an electromagnetic field tending to tilt the armature 17 about its pivot point 18 to pull contact point 24 away from the contact point 28. While the contact points 24, 28 are closed, some of the current which passes through them goes through the coil 84 to ground thereby establishing an electromagnetic field which also tends to open the contact points. The current which does not go through coils 83 and 84 to ground at point 86 goes through the field winding 81 to build up the generator field.

When the generator reaches such a speed that it is generating sufficient voltage to charge the battery 82, the electromagnetic field established by the coils 83, 84 is sufficiently strong to pivot the armature 57 against the bias of the spring 59 thereby closing contact 65 against contact 66. Current then flows from generator 80 through terminal 30, through the coil 70, through armature 57, the contact points 65, 66, the line 67 and terminal 69 to the battery 82. The coil 70 is wrapped around one leg of the soft iron bracket 100 establishing an electromotive force in the other leg of the bracket 100. This force is sufficiently strong that there is a leakage flux acting on the armature 17 which helps to open the contact 24, 28. This controlled leakage electromagnetic force, together with the force established by the coils 83 and 84, is sufficient to open switch 24, 28 and consequently an increased amount of current then flows through the resistor 75 to the contact point 87 where it splits, part of it going on to point 90 and part to point 91. With the switch 24, 28 open, the contact point 35 has not closed against contact point 34, so all of the current which flows to point 91 passes through the light bulb 36, then through the coil 85 to ground at point 88. The amount of current through light bulb 36 is small compared to that which flows through coil 84 to ground. The current through coil 85 establishes a field which helps to open switch 24, 28. Opening switch 24, 28 does not materially alter the current through coil 83 but it reduces the amount of current through coils 84, 85 with a consequent general reduction in the strength of the electromagnetic field tending to open switch 24, 28. The sharply reduced pull on the left end of armature 17 allows the spring 19 to reclose switch 24, 28, shunting out resistor 75 and re-establishing current flow through coils 84, 85 thereby re-establishing the electromagnetic field which opens switch 24, 28. In operation the contact points 24, 28 make and break quite rapidly, but contact points 35, 34 do not close until the voltage in the system rises to a dangerous point, as is described later. The resistor 75 has a resistance of about 3 ohms and being in parallel with the contact points 24, 28 it prevents arcing between contact points 24, 28 as the switch opens, thereby prolonging the life of the contact points and preventing them from sticking together.

The opening and closing of the contact points 24, 28 varies the strength of the field of the generator 80 by varying the amount of current through field winding 81. This rapidly changes the charging rate of the generator. The current fluctuations due to the opening and closing of contact points 24, 28 is quite rapid and the average current over a period of a few seconds may be shown on the ammeter of the car without causing the meter indicator to vibrate.

The electromagnetic field established by coils 83, 84, 85 also acts on armature 57 as the coils are wound around one leg of the bracket 100 as well as around one leg of the bracket 18. Armature 57 does not vibrate like armature 17. Under the pull of the field established by coils 83, 84, 85 it causes contact point 65 to close against contact point 66 and stay there as long as the generator 80 is generating sufficient current to charge battery 82. When the car is stopped, the generator stops charging and the electromagnetic field established by coils 83, 84, 85 drops to zero. Current then tries to flow from battery 82 to the generator 80 to cause the generator to run as a motor. This reverse current through coil 70 establishes a bucking electromagnetic field on the left end of armature 57 which is sufficient to overcome any small field then being established by coils 83, 84, 85, and opens contact points 65, 66, thereby disconnecting the battery 82 from the generator 80.

It will be seen that the coil 70 around the bracket 100 serves several purposes: While the generator 80 is charging the coil 70 tends to keep the contacts 65, 66 closed, and a controlled amount of magnetic flux leaks across to coil 23 which is comprised of individual coils 83, 84, 85 and serves as the current limiting control of the unit by influencing the vibration of the armature 17. And when the generator 80 is not charging the reverse current from the battery 82 to the generator 80 passes through coil 70 and establishes a magnetic field that bucks the field set up by coil 23 and helps to open contacts 65, 66. Thus it serves as a current control coil and a reverse current coil to prevent the battery 82 from discharging.

The coils 83, 84 are also multiple purpose coils: When the generator voltage builds up to a point that it will charge battery 82 or supply current to a load the magnetic field set up by coils 83, 84 closes the battery switch contacts 65, 66, and thereafter as the voltage continues to rise the same magnetic field acts to open contacts 24, 28, serving as the voltage limiting control.

When the battery 82 is in poor condition, that is when its charge is low, it is advisable to prevent excess current flow from the generator to the battery as this might harm the generator. While a normal amount of current is flowing from the generator to the battery the coil 70 establishes an electromagnetic force acting on armature 17 and tending to open contacts 24, 28. The force, however, is insufficient to alter the normal vibratory action of the armature. As the current flow to battery 82 increases toward a dangerous amount the pull exercised by coil 70 on armature 17 increases, thereby keeping contact points 24, 28 apart for a longer percentage of time without destroying its vibratory action and materially reducing the strength of the generator field. This reduces the charging ratio and reduces the current flow to a safe level.

When the generator is run at high speeds for a long period of time the voltage in the system is apt to exceed a safe value. When this unsafe condition is reached the pull on the left end of armature 17 by the combined fields established by coils 83, 84, 85 is sufficient to maintain contact points 24, 28 open for a longer percentage of the time and it also begins to close contact points 34, 35 intermittently with a vibratory action. Closing contact points 34, 35 short-circuits the light bulb 36 by establishing a low resistance path from 34, through 32 and coil 85 to ground at 88. Most of the generator field current goes to ground along this low resistance path, thereby sharply reducing the generator field excitation with consequent reduction in the current output from the generator. The light bulb 36 is in parallel with the contact points 34, 35 and during the rapid opening and closing of the contact points during voltage limiting action it prevents arcing, in much the same manner as the resistor 70 prevents arcing between the contact points 24, 28.

The bimetallic member 42 is so constructed that it biases the armature 17 in a direction tending to keep the contact points 24, 28 open. In winter when the temperature of the air around the bimetallic member 42 is colder than it is in the summer the bimetallic member 42 exerts less force against the right-hand end of the armature 17, thereby allowing the spring 19 to keep contact points 24, 28 closed for a longer percentage of the time with consequent increased battery charging. In summer the bimetallic member 42 stiffens up due to the increased temperature thereby exerting a greater bias force tending to keep contact points 24, 28 apart. This slightly reduces the generator charging rate to compensate for the reduced battery drain during summer operation.

A bimetallic member 43 is provided for biasing the armature 57 in accordance with the temperature of the surrounding air. It is so constructed that in summer it tends to close switch 65, 66 and to open it in wintertime.

If a car equipped with this invention is driven a great deal in cool weather, the motor heat and the heat from the light bulb 36 will be sufficient to warm the bimetallic member 42 and reduce the charging rate. It will be seen that the bulb 36 serves a triple purpose: (1) It is a resistor in the voltage control circuit; (2) it prevents arcing between contact points 34, 35; and (3) it serves as a heater during prolonged driving of a car to cause, through the bimetallic member 42, the generator charging rate to drop slightly. As a resistance in the voltage control circuit it has two different values during two different conditions of the circuit. When the contact points 24, 28 are open current flows through the bulb heating it up. In its hot condition it has a resistance of about 12 ohms. When the bulb is operating cool due to the rapid opening and closing of contact points 34, 35 the bulb has a resistance of about 4 ohms. Using a bulb designed for 12 volt operation in the circuit where the voltage very seldom goes much above 8 volts assures long bulb life. In fact a device of this type has been bench-tested the equivalent of about 50,000 miles of car operation without a single bulb failure. Thus, bulb 36 is a temperature sensitive variable resistor connected to ground in series with regulating coil 85.

Figure 5:
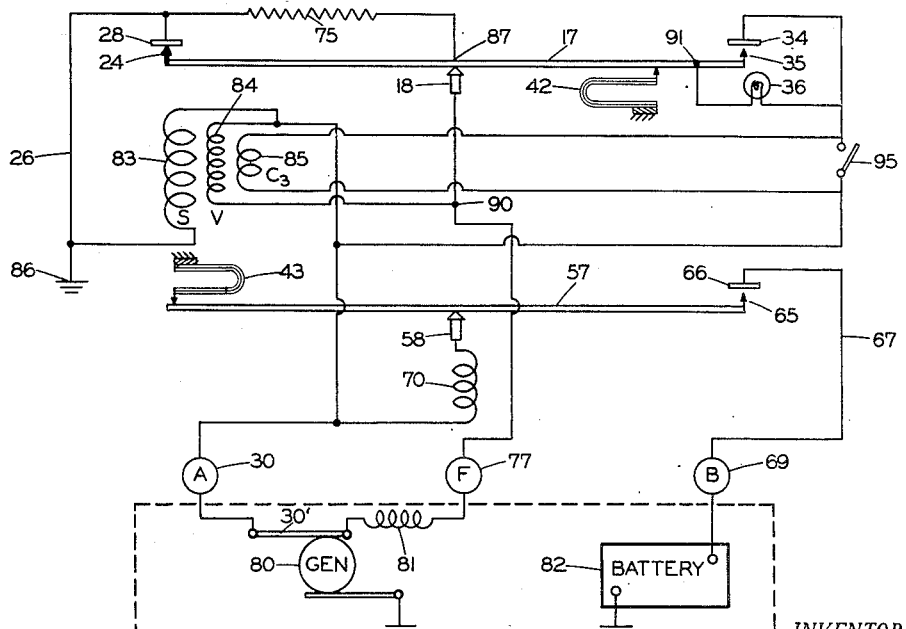
Figure 5 is a circuit diagram of a slightly modified regulator device.

Figure 4 is a circuit diagram illustrating the system of my invention as applied to one of the popular makes of automobiles, and Figure 5 is a circuit diagram illustrating the invention applied to another popular make. The invention, however, and the principles involved are substantially the same.

The main difference between the circuits of Figs. 4 and 5 is that in Fig. 5 the coils 81 and 84 are connected in parallel to point 90 in the generator field circuit and thence to ground at 86, and not directly to ground as in Fig. 4.

In either of the circuits of Fig. 4 or 5 the coil 85 may be shorted out by closing switch 95. This reduces the percentage of time that the contacts 24, 28 are open by reducing the electromagnetic pull on the left end of the armature 17. This substantially increases the charging rate of the generator system. For ordinary winter-summer driving the compensation provided by the light bulb and the thermostatic control is sufficient. However, for extremely cold weather or other extreme conditions which require considerable charge on the battery, the switch 95 is provided.

The previous description of the operation of the device of this invention has included three coils 83, 84, 85 for establishing an electromagnetic force on the armature 17 for regulatory purposes. It has been found that the coil 85 is unnecessary if the armature 17 is carefully balanced on the bracket 18. Thus by positioning the rivet 20 substantially directly above the bracket 18 I have found that the coil 85 can be dispensed with, and the thermostatic adjustment of the regulator is sufficient for ordinary summer-winter driving. However, for severe climatic changes it may be advisable to include the coil 85 and its shorting switch 95.

For operation in the regulator and electrical systems which have been described, I have found it very desirable to make one terminal of each of the pairs of contacts 24, 28 and 25, 34 out of tungsten and the other out of fine silver. This construction, together with the arc reducing resistors in shunt around each pair of contacts, assures an extremely long life for the switch points.

Another feature of the invention is that the resistor 75 connected around the contact points 24, 28 assures the maintenance of some field excitation on the generator 80 even though the contact points are open. In prior art systems if a speck of dirt lodged between the contact points and held them open for a short while, the generator field would collapse and it would be impossible to make the generator charge until the points were cleaned. In the construction of the invention the resistor 75 assures sufficient field on the generator 80 to cause the generator to generate approximately half of its normal current. This is sufficient to cause the armature 17 to vibrate and shake off any dirt which might be between the contact points 24, 28.

In prior art regulators the current output of the generator varies considerably depending upon whether the regulator unit is mounted upside-down or right-side up, and acceleration forces will cause a considerable variation in the charging rate. I have found that variations in current output up to about 50 per cent are usual in prior art devices. In the device of the present invention these variations due to acceleration forces are reduced practically to zero, and the charging rate remains the same whether the device is mounted in the car right-side up or up-side down. This characteristic is extremely valuable for a replacement device as it permits the person installing it complete freedom as to how he puts it in and where. The reason for this characteristic is that the armatures 17 and 57 are mounted on brackets 18 and 100 at their longitudinal center points. Accordingly gravitational and acceleration forces act substantially equally on both ends of the armatures and do not upset or alter the balance between the two ends thereof.

In an ordinary regulator device and system if one of the cells of the battery goes dead and establishes practically a short circuit therethrough, the regulator soon is harmed and may burn out completely if the car is driven above moderate speeds. With the device and system here described a dead battery cell will cause the system to operate at about 5 to 5½ volts, and the current will be about 35 to 40 amperes at moderate car speeds. This heavy current in coil 70 establishes a strong leakage field acting on armature 17 to help the coils 83, 84 to keep the contacts 24, 28 open almost all of the time. The majority of the current, therefore, goes through the resistor 75 and then through the generator field 81 to ground.

It is to be noted that there are no adjustment devices in the entire regulating device. The only adjustment which must be made is easily effected during assembly of the device. The contact points 24, 28, and 34, 35 and 65, 66 are set by feeler gages and the device is then put on a test bench. If any further adjustment is required the armature 17 or 57 is tapped gently to open or close the contact points until the desired operating conditions are obtained.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In an electrical system, the combination with a generator having a field winding and a storage battery; of regulator means comprising generator field circuit means connected from the generator armature to said field winding, said generator field circuit means including a field switch and a first armature carrying one of the contact points of said field switch, said field switch being closed when said generator is generating current, electromagnetic coil means connected to ground in parallel with a circuit including said field winding and said field switch, battery circuit means connecting said generator to said battery including a battery switch and a second electrically conductive armature carrying one of the contact points of said battery switch, said battery switch being open when said generator is not generating current, battery coil means connected in series between said generator and said battery, said electromagnetic coil means establishing an electromagnetic force for closing said battery switch and for tending to open said field switch when said generator generates sufficient current to charge said battery, and thermostatic control means tending to open said field switch when heated and to close said field switch when cooled.

2. In an electrical system, the combination with a generator having a field winding and a storage battery; of regulator means comprising generator field circuit means connected from the generator armature to said field winding, said generator field circuit means including a field switch and a first armature carrying one of the contact points of said field switch, said field switch being closed when said generator is generating current, electromagnetic coil means connected to ground in parallel with a circuit including said field winding and said field switch, battery circuit means connecting said generator to said battery including a battery switch and a second electrically conductive armature carrying one of the contact points of said battery switch, said battery switch being open when said generator is not generating current, battery coil means connected in series between said generator and said battery, said electromagnetic coil means establishing an electromagnetic force for closing said battery switch and for tending to open said field switch when said generator generates sufficient current to charge said battery, and thermostatic control means tending to open said battery switch when cooled and close said battery switch when heated.

3. In an electrical system, the combination with a generator having a field winding and a storage battery; of regulator means comprising generator field circuit means connected from the generator armature to said field winding, said generator field circuit means including a field switch and a first armature carrying one of the contact points of said field switch, said field switch being closed when said generator is generating current, electromagnetic coil means connected to ground in parallel with a circuit comprising said generator field winding and said field switch, a regulating coil connected to said generator field circuit means and connected to ground in series with said field switch, battery circuit means connecting said generator to said battery including a battery switch and a second electrically conductive armature carrying one of the contact points of said battery switch, said battery switch being open when said generator is not generating current, and battery coil means connected in series between said generator and said battery, said electromagnetic coil means establishing an electromagnetic force for closing said battery switch and for tending to open said field switch when said generator generates sufficient current to charge said battery.

4. An electrical system as set forth in claim 3, further characterized by a temperature sensitive variable resistor connected in series with said regulating coil.

5. In an electrical system, the combination with a generator having a field winding and a storage battery; of regulator means comprising generator field circuit means connected from the generator armature to said field winding, said generator field circuit means including a field switch and a first armature carrying one of the contact points of said field switch, said field switch being closed when said generator is generating current, electromagnet coil means comprising a plurality of coils the first coil of which is connected to ground in parallel with a circuit comprising said generator field switch and said generator field winding and the second coil of which is connected to ground in series with said generator field switch, battery circuit means connecting said generator to said battery including a battery switch and a second electrically conductive armature carrying one of the contact points of said battery switch, said battery switch being open when said generator is not generating current, and battery coil means connected in series between said generator and said battery, said electromagnetic coil means establishing an electromagnetic force for closing said battery switch and for tending to open said field switch when said generator generates sufficient current to charge said battery.

6. In an electrical system, the combination with a generator having a field winding, of regulator means comprising generator field circuit means connected from the generator armature to said field winding, said generator field circuit means including a field switch and an armature carrying one of the contact points of said field switch, said field switch being closed when said generator is generating current, a first electromagnetic coil connected to ground in parallel with a circuit including said generator field winding and said field switch, a second electromagnetic coil connected to ground in parallel with said generator field winding, said first and second electromagnetic coils when energized establishing an electromagnetic force on said armature tending to open said field switch, a voltage control circuit connected to ground in parallel with said generator field winding, said voltage control circuit including a series connected resistor and a normally open switch circuit around said resistor, the switch in said voltage control circuit being actuated by said armature to close said switch circuit thereby to shunt out said resistor and establish a low resistance ground connection in parallel with said generator field winding thereby to quickly collapse a substantial amount of the field excitation.

7. An electrical system as set forth in claim 6, further characterized by said series connected resistor comprising a temperature sensitive resistor whose resistance at low temperatures is low compared to its resistance at higher temperature.

8. An electrical system as set forth in claim 6, further characterized by said series connected resistor comprising a light bulb.

9. In an electrical system for use in combination with a generator having a field winding; regulator means comprising circuit means connected from the generator armature to the field winding and including a field switch, an armature mounted for vibratory motion and adapted to actuate said field switch, a first electromagnetic coil connected to said circuit means and connected to ground in parallel with a circuit including said generator field winding and said field switch, and a second electromagnetic coil connected to ground in parallel with said field winding and connected to said circuit means between said field switch and said field winding.

10. An electrical system as set forth in claim 9, further characterized by a resistor connected in shunt around said field switch.

11. In an electrical system, the combination with a storage battery and a generator having a field winding, of regulator means comprising: first and second support means; first and second armature means connected respectively to said first and second support means for pivotal motion with respect thereto; a field switch in said generator field circuit; first, second, and third coil means wrapped about the first of said support means and comprising a first electromagnet; said first coil being connected between said generator and ground, said second and third coils being connected to ground in parallel between said generator field winding and said field switch; a fourth coil wrapped about the second of said support means and comprising a second electromagnet, said fourth coil being connected in series between said generator and said battery.

12. An electrical system as set forth in claim 11, further characterized by thermostatic control means biasing said first and said second armature means.

13. An electrical system as set forth in claim 12, further characterized by resistor means in series with said third coil, the resistance of said resistor rising as the voltage established by said generator rises, and said resistor being in heat transfer relationship with said thermostatic control means.

PETTER KUHAR.

References Cited in the file of this patent

UNITED STATES PATENTS

| Number | Name | Date |
|---|---|---|
| 1,149,054 | Hoppe et al. | Aug. 3, 1915 |
| 1,260,648 | Conrad | Mar. 26, 1918 |
| 1,302,817 | Leonard | May 6, 1919 |
| 1,313,051 | Barton | Aug. 12, 1919 |
| 1,362,898 | Schwagermann | Dec. 21, 1920 |
| 1,392,252 | Delano | Sept. 27, 1921 |
| 1,820,361 | Menzel | Aug. 25, 1931 |
| 1,901,828 | Broekhuysen | Mar. 14, 1933 |
| 1,919,891 | Leingang | July 25, 1933 |
| 1,964,374 | Williams | June 26, 1934 |
| 2,033,013 | Thompson | Mar. 3, 1936 |
| 2,289,582 | Loesch | July 14, 1942 |
| 2,354,038 | Menzel | July 18, 1944 |
| 2,443,968 | Swing | June 22, 1948 |

FOREIGN PATENTS

| Number | Country | Date |
|---|---|---|
| 14,478 | Great Britain | June 19, 1911 |
| 748,050 | France | Apr. 10, 1933 |